(12) United States Patent
Lu et al.

(10) Patent No.: US 11,758,625 B1
(45) Date of Patent: Sep. 12, 2023

(54) LIGHTING DEVICE HAVING ILLUMINATION COMPENSATION FUNCTION AND METHOD THEREOF

(71) Applicant: Xiamen PVTECH Co., Ltd., Fujian (CN)

(72) Inventors: Fuxing Lu, Fujian (CN); Rongtu Liu, Fujian (CN); Hao Ye, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 52 days.

(21) Appl. No.: 17/857,037

(22) Filed: Jul. 3, 2022

(30) Foreign Application Priority Data

Mar. 11, 2022 (CN) .......................... 202210252503.2

(51) Int. Cl.
*H05B 45/10* (2020.01)
*F21V 23/04* (2006.01)
*F21V 23/00* (2015.01)
*F21Y 115/10* (2016.01)

(52) U.S. Cl.
CPC ........... *H05B 45/10* (2020.01); *F21V 23/002* (2013.01); *F21V 23/04* (2013.01); *F21Y 2115/10* (2016.08)

(58) Field of Classification Search
CPC ...................................................... H05B 45/10
See application file for complete search history.

(56) References Cited

U.S. PATENT DOCUMENTS

| 11,499,703 | B1* | 11/2022 | Smith ....................... F21S 4/10 |
| 2009/0027034 | A1* | 1/2009 | Sohnis ................... H05B 45/14 323/318 |
| 2009/0134816 | A1* | 5/2009 | Sloan ..................... H05B 45/48 315/307 |
| 2012/0081014 | A1* | 4/2012 | Blanchard .............. H05B 45/14 315/185 R |
| 2019/0104576 | A1* | 4/2019 | Tsai .......................... F21S 4/26 |
| 2021/0126461 | A1* | 4/2021 | Poojary ................. H02J 3/1864 |

* cited by examiner

*Primary Examiner* — Christopher E Dunay
(74) *Attorney, Agent, or Firm* — Winston Hsu

(57) ABSTRACT

A lighting device includes a light source, a conducting wire, a controller and a coding switch. The conducting wire is connected to the light source. The controller is connected to a power source and a conducing wire. The coding switch is connected to the controller. The coded value of the coding switch is adjustable, such that the coded value is corresponding to the wire length of the conducting wire. The controller adjusts the duty cycle of a driving signal according the wire length corresponding to the coded value, and outputs the driving signal to the light source in order to drive the light source. The lighting device can provide the illumination compensation function via the coding switch without a phototube, which can significantly reduce the cost of the lighting device in order to satisfy the actual requirements.

4 Claims, 3 Drawing Sheets

LIGHTING DEVICE HAVING ILLUMINATION COMPENSATION FUNCTION AND METHOD THEREOF

BACKGROUND OF THE INVENTION

1. Field of the Invention

The present invention relates to a lighting device, in particular to a lighting device having illumination compensation function. The present invention further relates to the illumination compensation method of the lighting device.

2. Description of the Prior Art

The illuminations of currently available lighting devices may be influenced because the wire lengths of the conducting wires thereof (connected to the light sources thereof) are changed. Some currently available lighting devices may provide the illumination compensation function. In general, the illumination compensation function can be realized by a phototube, which can detect the illumination of the environment, such that the controller of the lighting device can perform illumination compensation for the lighting device according to the illumination of the environment. However, the above illumination compensation mechanism would significantly increase the cost of the lighting device, so cannot conform to actual requirements.

SUMMARY OF THE INVENTION

One embodiment of the present invention provides a lighting device having illumination compensation function, which includes a light source, a conducting wire, a controller and a coding switch. The conducting wire is connected to the light source. The controller is connected to a power source and a conducing wire. The coding switch is connected to the controller. The coded value of the coding switch is adjustable, such that the coded value is corresponding to the wire length of the conducting wire. The controller adjusts the duty cycle of a driving signal according the wire length corresponding to the coded value, and outputs the driving signal to the light source in order to drive the light source.

In one embodiment, the coding switch has a plurality of buttons, and the on/off states of the buttons are corresponding to different coded values respectively.

In one embodiment, the duty cycle of the driving signal is the sum of a reference duty cycle, and the product of the wire length of the conducting wire and a compensation coefficient.

In one embodiment, the compensation coefficient is the ratio of the duty cycle of the driving signal to the wire length of the conducting wire.

In one embodiment, the light source is a lighting-emitting diode (LED) or an LED array.

Another embodiment of the present invention provides an illumination compensation method for lighting devices, which includes the following steps: connecting a conducting wire to a light source; connecting a controller to a power source and the conducting wire; connecting a coding switch to the controller; adjusting the coded value of the coding switch to make the coded value be corresponding to the wire length of the conducting wire; adjusting the duty cycle of the driving signal of the controller according to the wire length corresponding to the coded value by the controller; and outputting the driving signal to the light source by the controller so as to drive the light source.

In one embodiment, the coding switch has a plurality of buttons, and the on/off states of the buttons are corresponding to different coded values respectively.

In one embodiment, the duty cycle of the driving signal is the sum of a reference duty cycle, and the product of the wire length of the conducting wire and a compensation coefficient.

In one embodiment, the compensation coefficient is the ratio of the duty cycle of the driving signal to the wire length of the conducting wire.

In one embodiment, the light source is an LED or an LED array.

The lighting device having illumination compensation function and the method thereof in accordance with the embodiments of the present invention may have the following advantages: (1) In one embodiment of the present invention, the lighting device having illumination compensation function has a coding switch connected to the controller thereof. The user can adjust the coded value of the coding switch to make the coded value be corresponding to the wire length of the conducting wire connecting the controller to the light source. Then, the controller can adjust the duty cycle of the driving signal according to the wire length corresponding to the coded value. Afterward, the controller can output the driving signal to the light source in order to drive the light source. The above mechanism can effectively perform illumination compensation for the lighting device so as to enhance the performance of the lighting device. (2) In one embodiment of the present invention, the lighting device having illumination compensation function can have several coding switches and these coding switches are corresponding to a plurality of light sources respectively so as to execute illumination compensation for these light sources at the same time. Thus, the above mechanism can effectively perform illumination compensation for the lighting device so as to further enhance the performance of the lighting device. (3) In one embodiment of the present invention, the lighting device having illumination compensation function can calculate the duty cycle of the driving signal according to the sum of a reference duty cycle, and the product of the wire length of the conducting wire and a compensation coefficient. The above calculation method can more accurately calculate the duty cycle of the driving signal capable of achieving desired illumination compensation effect. Accordingly, the illumination compensation effect of the lighting device can be effectively improved. (4) In one embodiment of the present invention, the lighting device having illumination compensation function can provide the illumination compensation function without a phototube, which can greatly reduce the manufacturing cost of the lighting device so as to satisfy actual requirements. (5) In one embodiment of the present invention, the circuit design of the lighting device having illumination compensation function can be applied to various types of lighting devices, which can be more flexible in use and more comprehensive in application.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
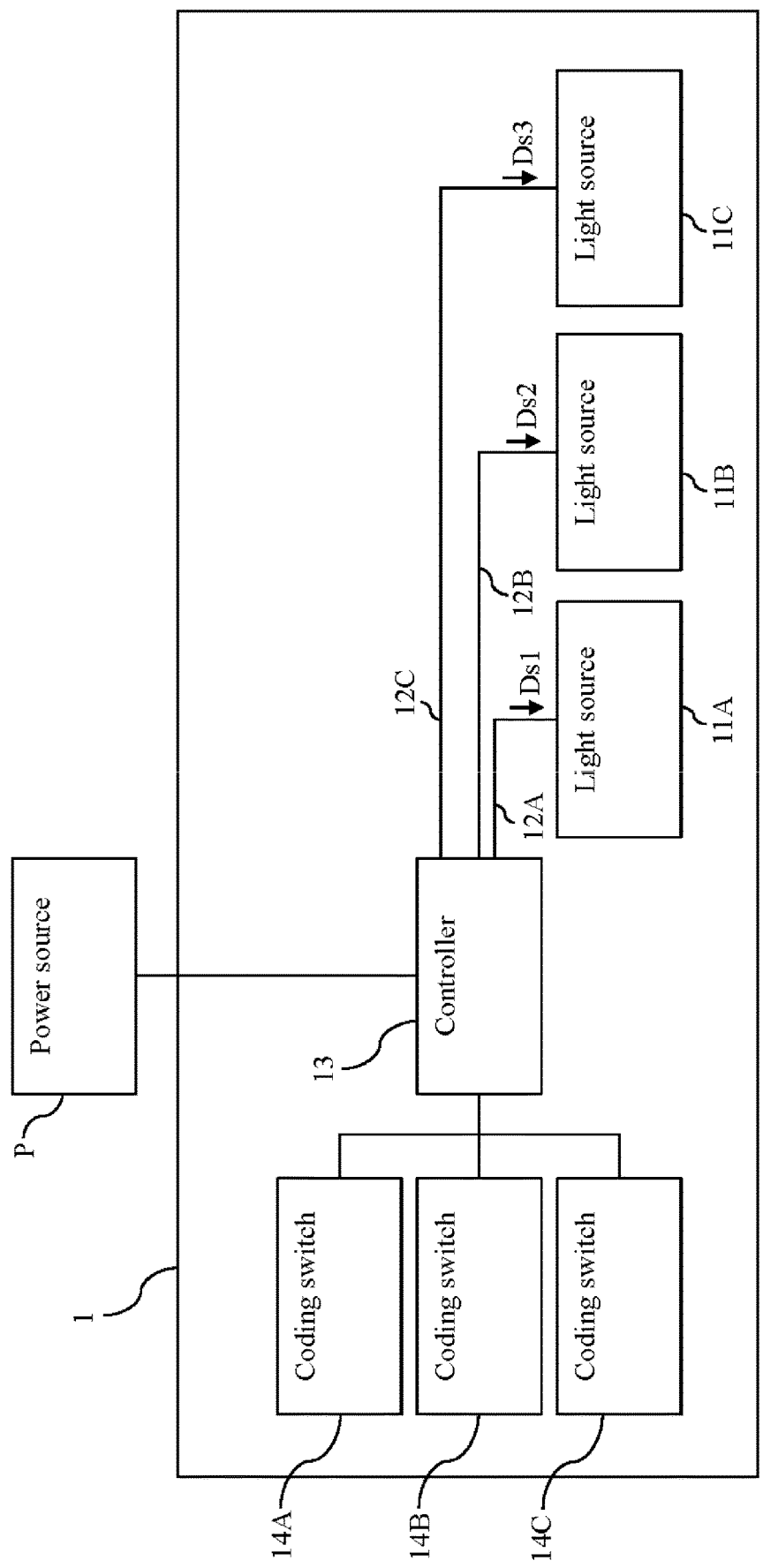
FIG. 1 is a block diagram of a lighting device having illumination compensation function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of a lighting device having illumination compensation function in accordance with one embodiment of the present invention. As shown in FIG. 1, the lighting device 1 having illumination compensation function includes three light sources 11A, 11B, 11C, three conducting wires 12A, 12B, 12C, a controller 13 and three coding switches 14A, 14B, 14C.

The conducting wires 12A, 12B, 12C are connected to the light sources 11A, 11B, 11C respectively. In one embodiment, the light sources 11A, 11B, 11C may be LEDs, LED arrays or other similar elements.

The controller 13 is connected to a power source P and the conducting wires 12A, 12B, 12C, such that the controller 13 can be connected to the light sources 11A, 11B, 11C via the conducting wires 12A, 12B, 12C. In one embodiment, the controller 13 may be a microcontroller unit (MCU), a central-processing unit (CPU), an application specific integrated circuit (ASIC) or other similar elements. In one embodiment, the power source P may be a DC power source or an AC power source.

The coding switches 14A, 14B, 14C are connected to the controller 13. The coding switches 14A, 14B, 14C are corresponding to the conducting wires 12A, 12B, 12C respectively. The coded values of the coding switches 14A, 14B, 14C are adjustable. Therefore, the user can adjust the coded values of the coding switches 14A, 14B, 14C to make the coded values be corresponding to the wire lengths of the conducting wires 12A, 12B, 12C respectively.

After the user adjusts the coded values of the coding switches 14A, 14B, 14C to be corresponding to the wire lengths of the conducting wires 12A, 12B, 12C respectively, the controller 13 can adjust the duty cycles of the driving signals Ds1, Ds2, Ds3 according to the wire lengths corresponding to the coded values of the coding switches 14A, 14B, 14C. Then, the controller 13 outputs the driving signals Ds1, Ds2, Ds3 to the light sources 11A, 11B, 11C respectively so as to drive the light sources 11A, 11B, 11C.

The duty cycles of the driving signals Ds1, Ds2, Ds3 are relevant to the wire lengths of the conducting wires 12A, 12B, 12C. Taking the driving signal Ds1 as an example, the relation between the driving signal Ds1 and the wire length of the conducting wire 12A is as shown in Equation (1) given below:

$$Duty1 = L1 * K1 + D0 \quad \ldots (1)$$

In Equation (1), Duty1 stands for the duty cycle of the driving signal Ds1; L1 stands for the wire length of the conducting wire 12A; K1 stands for the compensation coefficient; D0 stands for the reference duty cycle. In one embodiment, D0 is a default value and the user can adjust the default value according to actual requirements. For example, D0 may be corresponding to the quantity of the light sources of the lighting device 1. For instance, if the user wants to increase the brightness of the lighting device 1, the user can increase the value of D0 so as to meet actual requirements. In one embodiment, the compensation coefficient K1 is the ratio of the duty cycle of the driving signal Ds1 to the wire length of the conducting wire 12A.

In this embodiment, the controller 13 can calculate the sum of the reference duty cycle D0, and the product of the wire length of the conducting wire 12A and the compensation coefficient K1 so as to obtain the duty cycle of the driving signal Ds1. The above calculation method can more accurately calculate the duty cycle of the driving signal Ds1 for illumination compensation, so the illumination compensation effect can be optimized.

Similarly, the relation between the driving signal Ds2 and the wire length of the conducting wire 12B is as shown in Equation (2) given below:

$$Duty2 = L2 * K2 + D0 \quad \ldots (2)$$

In Equation (2), Duty2 stands for the duty cycle of the driving signal Ds2; L2 stands for the wire length of the conducting wire 12B; K2 stands for the compensation coefficient; D0 stands for the reference duty cycle.

The relation between the driving signal Ds3 and the wire length of the conducting wire 12C is as shown in Equation (3) given below:

$$Duty3 = L3 * K3 + D0 \quad \ldots (2)$$

In Equation (3), Duty3 stands for the duty cycle of the driving signal Ds3; L3 stands for the wire length of the conducting wire 12C; K3 stands for the compensation coefficient; D0 stands for the reference duty cycle.

Accordingly, when the controller 13 is driven, the controller 13 reads the coded values of the coding switches 14A, 14B, 14C to generate the driving signals Ds1, Ds2, Ds3 respectively so as to drive the light sources 11A, 11B, 11C. The loss is relevant to the wire length of the conducting wire. If the input voltages of several conducting wires having different wire lengths are the same with each other, the conducting wire having greater wire length incurs higher loss, which decreases the output power thereof. Similar, the loss is also relevant to the wire diameter of the conducting wire. If the input voltages of several conducting wires having different wire diameters are the same with each other, the conducting wire having greater wire diameter incurs higher loss, which also decreases the output power thereof. As a result, the illumination compensation function can be effectively executed via the above mechanism.

Figure 2:
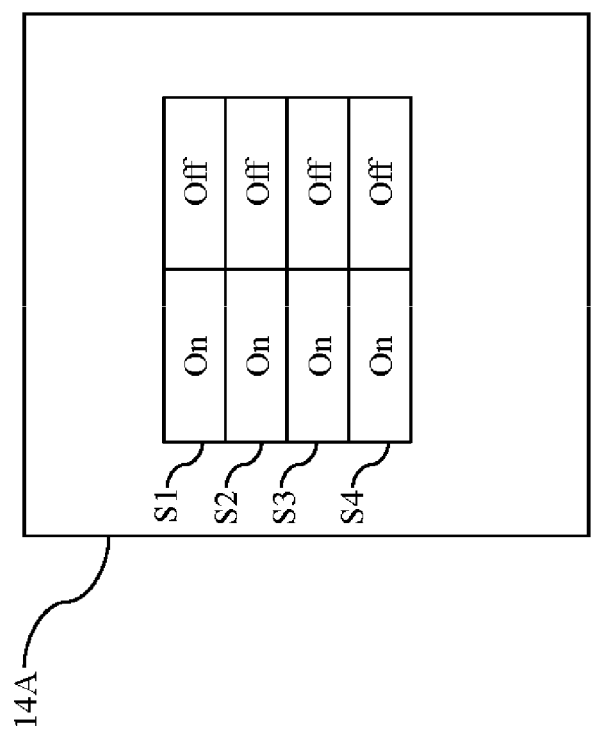
FIG. 2 is a schematic view of a coding switch of the lighting device having illumination compensation function in accordance with one embodiment of the present invention.

The embodiment just exemplifies the present invention and is not intended to limit the scope of the present inven- Please refer to FIG. 2, which is a schematic view of a coding switch of the lighting device having illumination compensation function in accordance with one embodiment of the present invention. As shown in FIG. 2, the coding switch 12A has four buttons S1, S2, S3, S4. The on/off states of the buttons S1, S2, S3, S4 are corresponding to different coded values respectively. For instance, the on state of the button S1 is corresponding to 1 and the off state of the button S1 is corresponding to 0. The structures of the coding switches 14B, 14C are the same with that of the coding switch 14A. Therefore, different on/off states of the above buttons S1, S2, S3 are corresponding to different coded values respectively, and these coded values are corresponding to different wire lengths respectively, as shown in Table 1 given below:

TABLE 1

| 1 m: 0000 | 2 m: 0001 | 3 m: 0010 | 4 m: 0011 |
|---|---|---|---|
| 5 m: 0100 | 6 m: 0101 | 7 m: 0110 | 8 m: 0111 |
| 9 m: 1000 | 10 m: 1001 | 11 m: 1010 | 12 m: 1011 |
| 13 m: 1100 | 14 m: 1101 | 15 m: 1110 | 16 m: 1111 |

(m = meter)

Thus, in this embodiment, the on/off states of the four buttons S1, S2, S3, S4 are corresponding to 16 coded values respectively, and the 16 coded values are corresponding to 16 wire lengths. In another embodiment, the coding switch 14A can have five or more than five buttons. The on/off states of these buttons may be corresponding to different coded values respectively, and these coded values are corresponding to different wire lengths or wire diameters respectively.

The embodiment is just for illustration instead of limitation. The structure, button quantity and the adjustment mechanism of the coding switch 14A can be changed according to actual requirements. Any equivalent modification and variation according to the spirit of the present invention is to be also included within the scope of the following claims and their equivalents.

As set forth above, the lighting device 1 of this embodiment has the coding switches 14A, 14B, 14C, and the coding switches 14A, 14B, 14C are connected to the controller 13. The user can adjust the coded values of the coding switches 14A, 14B, 14C to make the coded values be respectively corresponding to the wire lengths of the conducting wires connecting the controller 13 to the light sources 11A, 11B, 11C. Afterward, the controller 13 respectively adjusts the duty cycles of the driving signals Ds1, Ds2, Ds3 according to the wire lengths corresponding to the coded values of the coding switches 14A, 14B, 14C. Finally, the controller 13 outputs the driving signals Ds1, Ds2, Ds3 to the light sources 11A, 11B, 11C so as to drive the light sources 11A, 11B, 11C. The above mechanism can effectively perform illumination compensation for the lighting device 1 so as to enhance the performance of the lighting device 1.

In addition, the lighting device 1 of this embodiment can realize the illumination compensation function via the coding switches 14A, 14B, 14C without a phototube. Thus, the manufacturing cost of the lighting device 1 can be decreased with an aim of satisfying actual requirements.

Further, the circuit design of the lighting device 1 of this embodiment can be applied to various types of lighting devices, which can be more flexible in use and more comprehensive in application.

The embodiment just exemplifies the present invention and is not intended to limit the scope of the present invention; any equivalent modification and variation according to the spirit of the present invention is to be also included within the scope of the following claims and their equivalents.

It is worthy to point out that the illuminations of the currently available lighting devices may be influenced because the wire lengths of the conducting wires thereof (connected to the light sources thereof) are changed. On the contrary, according to one embodiment of the present invention, the lighting device having illumination compensation function has a coding switch connected to the controller thereof. The user can adjust the coded value of the coding switch to make the coded value be corresponding to the wire length of the conducting wire connecting the controller to the light source. Then, the controller can adjust the duty cycle of the driving signal according to the wire length. Afterward, the controller can output the driving signal to the light source in order to drive the light source. The above mechanism can effectively perform illumination compensation for the lighting device so as to enhance the performance of the lighting device.

Also, according to one embodiment of the present invention, the lighting device having illumination compensation function can have several coding switches and these coding switches are corresponding to a plurality of light sources respectively so as to execute illumination compensation for these light sources at the same time. Thus, the above mechanism can effectively perform illumination compensation for the lighting device so as to further enhance the performance of the lighting device.

Further, according to one embodiment of the present invention, the lighting device having illumination compensation function can calculate the duty cycle of the driving signal according to the sum of a reference duty cycle, and the product of the wire length of the conducting wire and a compensation coefficient. The above calculation method can more accurately calculate the duty cycle of the driving signal capable of achieving desired illumination compensation effect. Accordingly, the illumination compensation effect of the lighting device can be effectively improved.

Moreover, according to one embodiment of the present invention, the lighting device having illumination compensation function can provide the illumination compensation function without a phototube, which can greatly reduce the manufacturing cost of the lighting device so as to satisfy actual requirements.

Furthermore, according to one embodiment of the present invention, the circuit design of the lighting device having illumination compensation function can be applied to various types of lighting devices, which can be more flexible in use and more comprehensive in application. As described above, the lighting device having illumination compensation function according to the embodiments can definitely achieve great technical effects.

Figure 3:
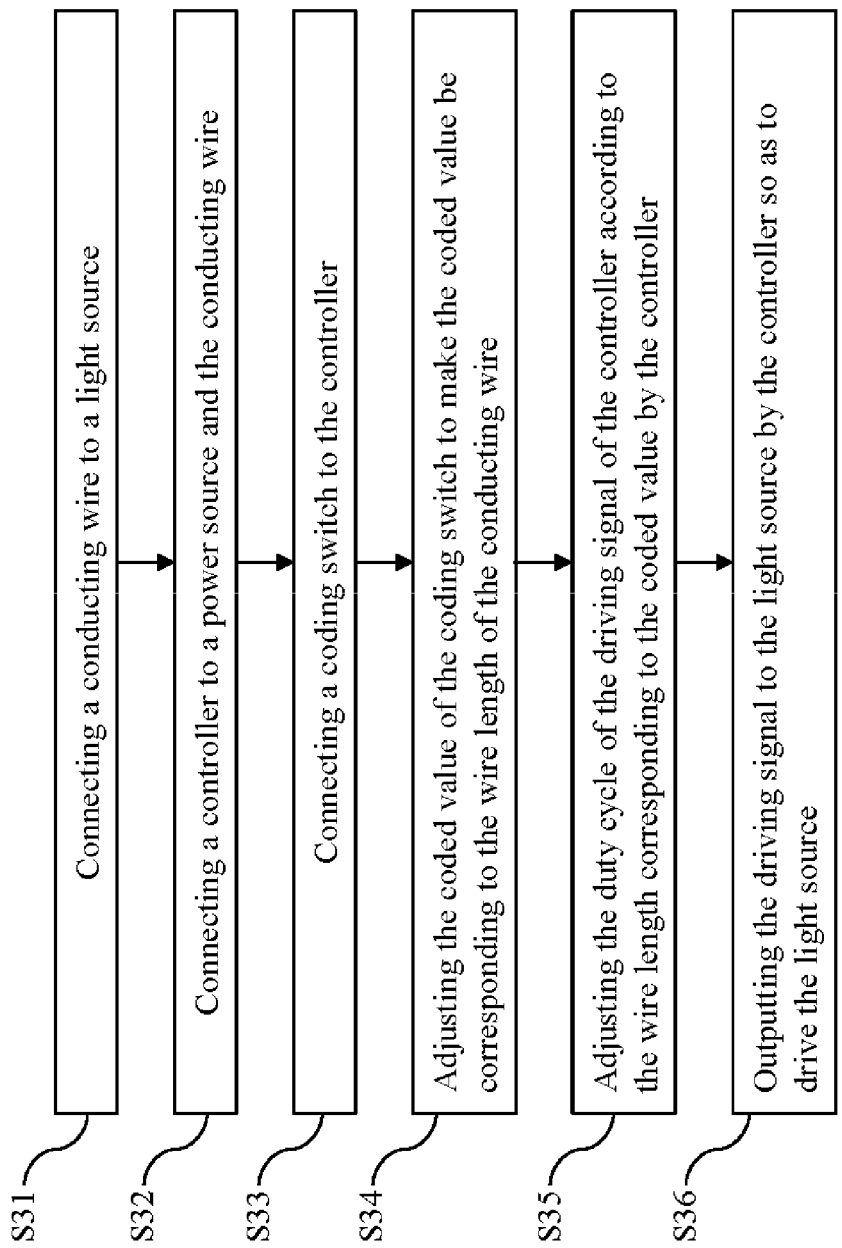
FIG. 3 is a flow chart of an illumination compensation method for lighting devices in accordance with one embodiment of the present invention.

Please refer to FIG. 3, which is a flow chart of an illumination compensation method for lighting devices in accordance with one embodiment of the present invention. As shown in FIG. 3, the illumination compensation method according to this embodiment includes the following steps:

Step S31: connecting a conducting wire to a light source.

Step S32: connecting a controller to a power source and the conducting wire.

Step S33: connecting a coding switch to the controller.

Step S34: adjusting the coded value of the coding switch to make the coded value be corresponding to the wire length of the conducting wire. In this step, the user can operate the coding switch to adjust the coded value of the coding switch according to the wire length of the conducting wire connected the controller to the light source. Thus, the coded value of the coding switch can be corresponding to the wire length of the conducting wire.

Step S35: adjusting the duty cycle of the driving signal of the controller according to the wire length corresponding to the coded value by the controller. As set forth above, the controller can calculate the sum of the reference duty cycle, and the product of the wire length of the conducting wire and the compensation coefficient in order to obtain the duty cycle of the driving signal.

Step S36: outputting the driving signal to the light source by the controller so as to drive the light source. Finally, the controller outputs the driving signal to the light source in order to drive the light source and executes illumination compensation at the same time.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the lighting device having illumination compensation function has a coding switch connected to the controller thereof. The user can adjust the coded value of the coding switch to make the coded value be corresponding to the wire length of the conducting wire connecting the controller to the light source. Then, the controller can adjust the duty cycle of the driving signal according to the wire length corresponding to the coded value. Afterward, the controller can output the driving signal to the light source in order to drive the light source. The above mechanism can effectively perform illumination compensation for the lighting device so as to enhance the performance of the lighting device.

Also, according to one embodiment of the present invention, the lighting device having illumination compensation function can have several coding switches and these coding switches are corresponding to a plurality of light sources respectively so as to execute illumination compensation for these light sources at the same time. Thus, the above mechanism can effectively perform illumination compensation for the lighting device so as to further enhance the performance of the lighting device.

Further, according to one embodiment of the present invention, the lighting device having illumination compensation function can calculate the duty cycle of the driving signal according to the sum of a reference duty cycle, and the product of the wire length of the conducting wire and a compensation coefficient. The above calculation method can more accurately calculate the duty cycle of the driving signal capable of achieving desired illumination compensation effect. Accordingly, the illumination compensation effect of the lighting device can be effectively improved.

Moreover, according to one embodiment of the present invention, the lighting device having illumination compensation function can provide the illumination compensation function without a phototube, which can greatly reduce the manufacturing cost of the lighting device so as to satisfy actual requirements.

Furthermore, according to one embodiment of the present invention, the circuit design of the lighting device having illumination compensation function can be applied to various types of lighting devices, which can be more flexible in use and more comprehensive in application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having illumination compensation function, comprising:
   a light source;
   a conducting wire selected from a plurality of wires, connected to the light source;
   a controller, connected to a power source and the conducting wire; and
   a coding switch, connected to the controller, wherein a coded value of the coding switch is selectable from a plurality of coded values, whereby the plurality of coded values correspond to a wire lengths of the plurality of conducting wires;
   a plurality of buttons disposed on the coding switch, wherein each of the plurality of buttons has an on and off state, and wherein the combined on and off states of the plurality of buttons define a plurality of combinations such that each of the plurality of combinations correspond to a different coded value of the plurality of coded values;
   wherein the controller adjusts a duty cycle of a driving signal according the wire length corresponding to the coded value, and outputs the driving signal to the light source in order to drive the light source, wherein the duty cycle of the driving signal is a sum of a reference duty cycle, and a product of the wire length of the conducting wire and a compensation coefficient.

2. The lighting device having illumination compensation function as claimed in claim 1, wherein the light source is a lighting-emitting diode (LED) or an LED array.

3. An illumination compensation method for a lighting device, comprising:
   connecting a conducting wire to a light source, wherein the conducting wire is selected from a plurality of conducting wires each having a different wire length;
   connecting a controller to a power source and the conducting wire;
   connecting a coding switch to the controller, wherein a plurality of buttons are disposed on the coding switch, wherein each of the plurality of buttons has an on and off state, wherein the combined on and off states of the plurality of buttons define a plurality of combinations such that each of the plurality of combinations correspond to a different coded value of a plurality of coded values, wherein each coded value of the plurality of coded values corresponds to the wire length of one of the plurality of conducting wires;
   adjusting the coded value of the coding switch to make the coded value correspond to the wire length of the conducting wire;

adjusting a duty cycle of a driving signal of the controller according to the wire length corresponding to the coded value by the controller, wherein the duty cycle of the driving signal is a sum of a reference duty cycle, and a product of the wire length of the conducting wire and a compensation coefficient; and outputting the driving signal to the light source by the controller so as to drive the light source.

4. The illumination compensation method for the lighting device as claimed in claim 3, wherein the light source is an LED or an LED array.

\* \* \* \* \*